No. 796,252. PATENTED AUG. 1, 1905.
W. L. ROSS & D. C. TOLLINGER.
MIXING FAUCET.
APPLICATION FILED APR. 28, 1904.
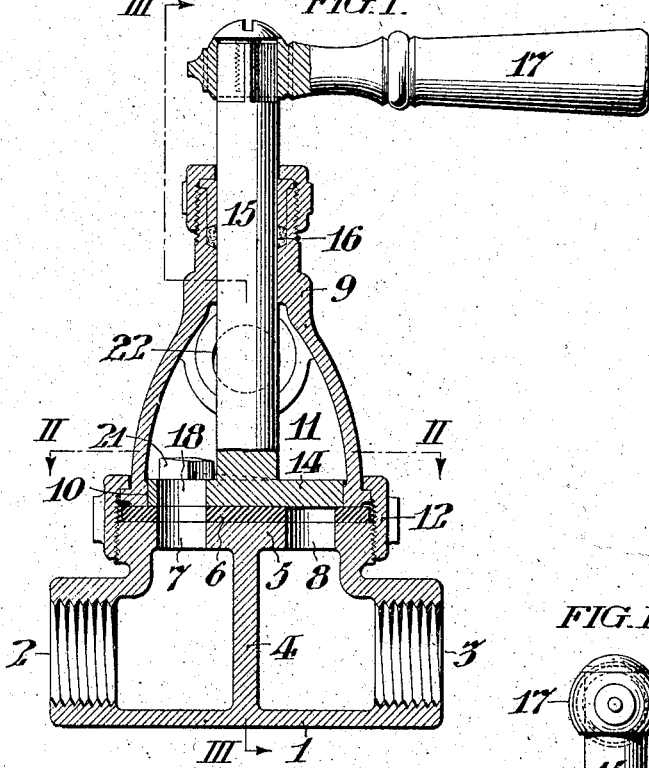
WITNESSES:
Clifton C. Hallowell
John C. Bugner
INVENTORS:
WILLIAM L. ROSS
AND
DAVID C. TOLLINGER,
by their attorneys
Paige Paul + Foley

UNITED STATES PATENT OFFICE.

WILLIAM L. ROSS AND DAVID C. TOLLINGER, OF PHILADELPHIA, PENNSYLVANIA.

MIXING-FAUCET.

No. 796,252. Specification of Letters Patent. Patented Aug. 1, 1905.

Application filed April 28, 1904. Serial No. 205,334.

*To all whom it may concern:*

Be it known that we, WILLIAM L. ROSS and DAVID C. TOLLINGER, of Philadelphia, in the county of Philadelphia and State of Pennsylvania, have invented certain new and useful Improvements in Mixing-Faucets, whereof the following is a specification, reference being had to the accompanying drawings.

Our invention relates to a mixing-faucet by which two liquids may be simultaneously discharged through a common aperture in any desired proportions or either one discharged alone, or both may be shut off.

The form of our invention as shown in the drawings is especially designed for regulating the admission of hot and cold water in any desired proportions to a bath or shower.

Our invention comprises a body having a valve-seat faced with a resilient or yielding medium, against which a casing is held in adjustable relation, a rotary valve-disk arranged to rotate in adjustable relation upon said valve-seat within the casing, a collar arranged to adjustably engage said body and casing, whereby the valve-disk is maintained against its seat with any desired degree of pressure, and cam-inclines on the top of the valve-disk which engage fixed lugs inside the casing to effect the tight closure of the valve.

In the accompanying drawings, Figure I is a central vertical section through a mixing-faucet embodying our invention. Fig. II is a horizontal section of the same, taken on the line II II of Fig. I. Fig. III is a vertical section of the same, taken on the line III III of Fig. I. Fig. IV is a perspective view of the valve-disk and its stem.

In said figures, 1 is the body of the faucet, having two equal and opposite openings 2 3 for the admission of liquid, separated from each other by a central partition 4. On the top of said body is formed the rigid circular valve-seat 5, the entire upper surface of which is faced with a disk 6 of a resilient or yielding material, preferably that which is known as "Jenkin's composition." The opening 2 communicates with the circular aperture 7, extending through said valve-seat and its facing, and the opening 3 communicates with a similar circular aperture 8, extending through said valve-seat and its facing diametrically opposite said aperture 6.

The casing 9 of the faucet comprises a valve-chamber 10, surmounted by a mixing-chamber 11, having a spout 22 issuing from its upper portion. The lower edge of said casing 9 is circular and rests upon the annular margin of the disk 6, which forms the facing of the valve-seat and is clamped thereto by the collar 12 in threaded engagement with the body and in flanged engagement with said casing. Said collar 12 is provided with an indented rim for the attachment of a wrench when adjustment is required. To prevent accidental rotation of the casing 9 with respect to the body 1 the lugs 13 13 depend from said casing into vertically-extending complementary recesses cut in the periphery of the valve-seat 5.

The valve-disk 14 is mounted for rotation within the valve-chamber 10 and is provided with a valve-stem 15, which is preferably integral with said disk. The upper end of the valve-stem 15 extends centrally up through the mixing-chamber 11, passing through a suitable stuffing-box 16 and projects from the top of the casing, above which latter it is provided with a handle 17. Said valve-disk 14 fills the valve-chamber 10 and rests closely upon the disk 6 and is pierced by two circular apertures 18 and 19, placed in relation to each other, as shown in Fig. II, where it will be observed that when one of them is in full registry with its corresponding aperture in the valve-seat the periphery of the other is in tangential relation with the periphery of its corresponding aperture in said valve-seat.

Upon the upper surface of the rotary valve-disk 14 and at its periphery two shallow cam-inclines 20 20 are formed, arranged to coöperate with lugs 21 21, which project from the interior of the casing 9 in contact with the upper surface of the valve-disk 14.

With the parts arranged in relation to each other as shown in the drawings it will be observed that the aperture 18 in the valve-disk 14 registers with the aperture 7, which communicates with the opening 2 of the body and which may be supposed to be in communication with a suitable source of hot-water supply. In like manner the opening 3 may be supposed to communicate with a suitable source of cold-water supply. As shown in Fig. II, the abrupt ends, respectively, of the cam-inclines 20 20 are in contact with the lugs 21 21. Consequently the valve cannot rotate any farther in that direction, and in that position the hot water is turned full on, while the cold water is entirely shut off. If now the valve be rotated in the opposite direction, as indicated by the arrow in Fig. II, the hot-water aperture is gradually closed, and at the same time the cold-water aperture is gradually opened until the aperture 19 in the valve-disk 14 registers with the aperture 8 in the seat, at which point the cold water is turned full on and the hot water completely turned off. By turning the valve still farther in the same direction the cold water is gradually shut off, thus entirely closing the faucet. As this latter motion proceeds the sloping surfaces of the cam-inclines 20 are presented in sliding contact with the lugs 21, so that by closing the faucet the valve-disk is given a strong additional thrust against its seat, thus preventing the possibility of any actual leakage when the valve is closed.

The central partition 4 serves to stoutly support the valve-seat 5 in its center against the pressure of the valve-disk when rotated to closure with engagement of the cam-inclines 20 and the lugs 21. When, therefore, the collar 12 is rotated to force the casing 9 down upon the valve-seat, the compression of the annular portion of the resilient disk 6, which lies between these opposing parts, forces the central portion of the resilient disk up against the valve-disk 14. This is because the entire disk 6, both the annular portion, which is opposed to the lower edge of the casing, and the central portion, which is opposed to the rotary valve-disk, is an integral piece. Consequently compression of one part results in expansion of the adjoining part. This action is increased by confining the disk 6 from outward expansion by the collar 12.

It is important in mixing-faucets that the valve-disk should be at all times in close contact with the valve-seat, because it will usually be found where there is a hot and cold water supply that one flows at a greater pressure than the other. Under such circumstances if the valve-disk does not fit closely upon its seat the hot and cold water will be continuously mixing below the valve. The result of this cross-leakage is that when the valve is opened for the purpose of supplying either hot water or cold water unmixed there will be supplied for a considerable time only a previously-formed mixture.

Difficulties have always been experienced with rotary disk valves in keeping the disk sufficiently tightly pressed against its seat to prevent leakage. To overcome this, resort has commonly been had to spring-pressure, which, however, is very objectionable, as springs in faucets soon rust and lose their tension. In the faucet shown in our previous Patent No. 736,023, dated August 11, 1904, we endeavored to overcome this difficulty by providing the disk with cam-inclines operating against fixed lugs to accomplish the firm pressure of the disk against the seat at the time of closure; but we have found that unless the seat of the valve be of a resilient material as described in the present application the wear of the valve against the seat will soon permit cross-leakage from the hot to the cold, or vice-versa. We find that by resorting to our present construction, in which the entire seat (both the central portion, which opposes the rotating valve-disk, and the surrounding annular portion, which opposes the lower edge of the casing) is made of resilient material it is possible to effectively use the cam-inclines for producing complete closure and yet to maintain the valve in proper operation without cross-leakage, for if that portion of the seat which opposes the rotary disk becomes in time worn down the tightening of the collar 12 restores the adjustment without interference with the efficiency of the cam-inclines to effect complete closure.

Having thus described our invention, we claim—

In a mixing-faucet, the combination of a body with a rigid circular valve-seat having two apertures communicating with different fluid-passages in the body; a rotary disk apertured to register with the apertures in the seat; a casing surrounding said disk; cam-inclines formed on the upper surface of the disk and in contact with the interior of the casing when the valve is rotated to closure; an integral resilient facing-disk covering both the central portion of the valve-seat opposed to the rotary disk, and the surrounding annular portion of the seat opposed to the casing, and filling the entire space between the seat on the one side and the valve-disk and casing on the other side; and means for pressing the casing down upon the seat whereby the central portion of the resilient facing-disk is forced into more intimate contact with the rotary disk, substantially as set forth.

In testimony whereof we have hereunto signed our names at Philadelphia, in the State of Pennsylvania, this 27th day of April, 1904.

WILLIAM L. ROSS.
DAVID C. TOLLINGER

Witnesses:
JAMES H. BELL,
E. L. FULLERTON.